(12) United States Patent
Lightner et al.

(10) Patent No.: US 6,732,031 B1
(45) Date of Patent: *May 4, 2004

(54) WIRELESS DIAGNOSTIC SYSTEM FOR VEHICLES

(75) Inventors: Bruce Lightner, La Jolla, CA (US);
Diego Botrego, San Diego, CA (US);
Chuck Myers, La Jolla, CA (US);
Larkin Hill Lowrey, La Jolla, CA (US)

(73) Assignee: Reynolds and Reynolds Holdings, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/447,713

(22) Filed: May 29, 2003

Related U.S. Application Data

(63) Continuation of application No. 09/776,106, filed on Feb. 1, 2001, now Pat. No. 6,636,790.
(60) Provisional application No. 60/222,152, filed on Aug. 1, 2000, provisional application No. 60/222,213, filed on Aug. 1, 2000, and provisional application No. 60/220,986, filed on Jul. 25, 2000.

(51) Int. Cl.[7] .............................................. G06F 7/00
(52) U.S. Cl. .......................................... 701/33; 701/29
(58) Field of Search .............................. 701/33, 29, 30, 701/35; 73/116, 117.2

(56) References Cited

U.S. PATENT DOCUMENTS

| | | |
|---|---|---|
| 3,748,894 A | 7/1973 | White et al. |
| 4,258,421 A | 3/1981 | Juhasz et al. |

(List continued on next page.)

FOREIGN PATENT DOCUMENTS

| | | |
|---|---|---|
| WO | 0816820 A2 | 1/1998 |
| WO | WO 00/79727 | 12/2000 |

OTHER PUBLICATIONS

RD–422061 A; Anonymous; Jun. 10, 1999; Abstract, Using Internet for vehicle diagnostics–enabling using to operate vehicle personal computer to direct web browser to vehicle diagnostics website . . . .

Bary W. Wilson et al., Modular system for multiparameter in–line machine fluid analysis (Technology showcase Apr. 3–6, 2000).

U.S. patent application Ser. No. 09/776,083, Banet et al., filed Feb. 1, 2001.
U.S. patent application Ser. No. 09/776,106, Lightner et al., filed Feb. 1, 2001.
U.S. patent application Ser. No. 09/804,888, Lowrey et al., filed Mar. 13, 2001.
U.S. patent application Ser. No. 09/908,440, Lightner et al., filed Jul. 18, 2001.
U.S. patent application Ser. No. 10/301,010, Lightner et al., filed Nov. 21, 2002.

(List continued on next page.)

*Primary Examiner*—Yonel Beaulieu
(74) *Attorney, Agent, or Firm*—Stephen C. Glazier; Kirkpatrick & Lockhart LLP

(57) ABSTRACT

The invention features a method and apparatus for remotely characterizing a vehicle's performance. The method features the steps of: i) generating data representative of the vehicle's performance with at least one microcontroller disposed within the vehicle; ii) transferring the data through an OBD, OBD-II or equivalent electrical connector to a data collector/router that includes a microprocessor and an electrically connected wireless transmitter; iii) transmitting a data packet representing the data with the wireless transmitter over an airlink to a wireless communications system and then to a host computer; and iv) analyzing the data packet with the host computer to characterize the vehicle's performance.

116 Claims, 4 Drawing Sheets

U.S. PATENT DOCUMENTS

| | | |
|---|---|---|
| 4,602,127 A | 7/1986 | Neely et al. |
| 4,926,330 A | 5/1990 | Abe et al. |
| 4,956,777 A | 9/1990 | Cearley et al. |
| 5,050,080 A | 9/1991 | Abe |
| 5,157,610 A | 10/1992 | Asano et al. |
| 5,289,378 A | 2/1994 | Miller et al. |
| 5,343,906 A | 9/1994 | Tibbals, III |
| 5,442,553 A | 8/1995 | Parrillo |
| 5,450,321 A | 9/1995 | Crane |
| 5,463,567 A | 10/1995 | Boen et al. |
| 5,473,540 A | 12/1995 | Schmitz |
| 5,479,479 A | 12/1995 | Braitberg et al. |
| 5,537,336 A | 7/1996 | Joyce |
| 5,574,427 A | 11/1996 | Cavallaro |
| 5,680,328 A | 10/1997 | Skorupski et al. |
| 5,732,074 A | 3/1998 | Spaur et al. |
| 5,737,215 A | 4/1998 | Schricker et al. |
| 5,754,965 A | 5/1998 | Hagenbuch |
| 5,758,300 A | 5/1998 | Abe |
| 5,797,134 A | 8/1998 | McMillan et al. |
| 5,808,907 A | 9/1998 | Shetty et al. |
| 5,850,209 A | 12/1998 | Lemke et al. |
| 5,884,202 A | 3/1999 | Arjomand |
| 5,928,292 A | 7/1999 | Miller et al. |
| 5,941,918 A | 8/1999 | Blosser |
| 6,064,970 A | 5/2000 | McMillan et al. |
| 6,104,988 A | 8/2000 | Klarer |
| 6,141,611 A | 10/2000 | Mackey et al. |
| 6,167,426 A | 12/2000 | Payne et al. |
| 6,263,268 B1 | 7/2001 | Nathanson |
| 6,295,492 B1 | 9/2001 | Lang et al. |
| 6,338,152 B1 | 1/2002 | Fera et al. |
| 6,356,205 B1 | 3/2002 | Salvo et al. |
| 6,459,988 B1 | 10/2002 | Fan et al. |
| 6,529,159 B1 | 3/2003 | Fan et al. |
| 6,552,682 B1 | 4/2003 | Fan et al. |
| 6,594,579 B1 | 7/2003 | Lowrey et al. |
| 6,604,033 B1 | 8/2003 | Banet et al. |
| 6,611,740 B2 | 8/2003 | Lowrey et al. |
| 6,636,790 B1 * | 10/2003 | Lightner et al. ............... 701/33 |

OTHER PUBLICATIONS

U.S. patent application Ser. No. 10/431,947, Hunt et al., filed May 8, 2000.

U.S. patent application Ser. No. 10/456,246, Lowrey et al., filed Jun. 6, 2003.

U.S. patent application Ser. No. 10/456,788, Banet et al., filed Jun. 6, 2003.

U.S. patent application Ser. No. 10/614,665, Lowrey et al., filed Jun. 7, 2003.

U.S. patent application Ser. No. 10/615,516, Lightner et al., filed Jul. 8, 2003.

U.S. patent application Ser. No. 10/625,942, Banet et al., filed Jul. 24, 2003.

U.S. patent application Ser. No. 10/626,779, Lightner et al., filed Jul. 24, 2003.

U.S. patent application Ser. No. 10/626,810, Lowrey et al., filed Jul. 24, 2003.

U.S. patent application Ser. No. 10/632,033, Banet et al., filed Jul. 31, 2003.

* cited by examiner

WIRELESS DIAGNOSTIC SYSTEM FOR VEHICLES

This application is a continuation application of U.S. patent application Ser. No. 09/776,106, filed Feb. 1, 2001, now U.S. Pat. No. 6,636,790, the contents of which are incorporated herein by reference, which claims the benefit of U.S. provisional patent applications Ser. Nos. 60/222,152, filed Aug. 1, 2000, 60/222,213, filed Aug. 1, 2000, and 60/220,986, filed Jul. 25, 2000, the contents of which are incorporated herein by reference.

RELATED APPLICATIONS

Under 35 U.S.C. §119(e)(1), this application claims benefit of prior U.S. Provisional Applications No. 60/222,152, entitled Wireless Diagnostic System for Characterizing a Vehicles Exhaust Emissions" filed Aug. 1, 2000; and No. 60/222,213, entitled "Wireless Diagnostic System for Characterizing One or More Vehicles' Mileage, Fuel Level, and Period of Operation" filed Aug. 1, 2000, both of which are incorporated herein by reference.

In addition, this application is related to the following U.S. Patent Applications that were filed on the same day as the present application: (1) U.S. Patent Application entitled "Wireless Diagnostic System for Characterizing a Vehicles Exhaust Emissions" with inventors Matthew J. Banet, Bruce Lightner, Diego Borrego, Chuck Myers, and Larkin H. Lowrey (Client/Matter No. 12170/003001); and (2) U.S. Patent Application entitled "Wireless Diagnostic System for Characterizing One or More Vehicles' Mileage, Fuel Level, and Period of Operation" with inventors Matthew J. Banet, Bruce Lightner, Diego Borrego, Chuck Myers, and Larkin H. Lowrey (Client/Matter No. 12170/004001), both of which are hereby incorporated by reference.

FIELD OF THE INVENTION

The present invention relates generally to the use of wireless communications and diagnostic systems in automotive vehicles.

BACKGROUND OF THE INVENTION

The Environmental Protection Agency (EPA) requires vehicle manufacturers to install on-board diagnostics (OBD) for emission control on their light-duty automobiles and trucks beginning with model year 1996. OBD systems (e.g., computer, microcontrollers, and sensors) monitor the vehicle's emission control systems to detect any malfunction or deterioration that causes emissions to exceed EPA-mandated thresholds. Such a system, for example, is an oxygen sensor located in the vehicle's exhaust manifold and tailpipe.

The EPA requires that all information monitored or calculated by OBD systems is made available through a standardized, serial 16-cavity connector referred to as the ALDL (Assembly Line Diagnostic Link) or OBD connector. All physical and electrical characteristics of this connector are standard for all vehicles sold in the United States after 1996. The EPA also mandates that, when emission thresholds are exceeded, diagnostic information characterized by OBD systems must be stored in the vehicle's central computer so that it can be used during diagnosis and repair.

A second generation of OBD systems ("OBD-II" systems) monitors a wide range of data that indicate the performance of the host vehicle. For example, these data can be analyzed to infer the vehicle's emission performance. In addition to emissions, OBD-II systems monitor vehicle speed, mileage, engine temperature, and intake manifold pressure. OBD-II systems also query manufacturer-specific data, such as data relating to the vehicle's engine, transmission, brakes, alarm, entertainment systems. OBD-II systems also monitor codes called diagnostic trouble codes, or "DTCs", which indicate a mechanic or electrical problem with the vehicle. DTCs are the codes that typically light a vehicle's 'service engine soon' light. In total, OBD-II systems typically access more than 300 segments of data relating to the performance and make of the host vehicle.

In addition to the OBD-II systems, most vehicles manufactured after 1996 have electronic control units (ECUs) that control internal electromechanical actuators. Examples include ECUs that control fuel-injector pulses, spark-plug timing, and anti-lock braking systems. Most ECUs transmit status and diagnostic information over a shared, standardized electronic buss in the vehicle. The buss effectively functions as an on-board computer network with many processors, each of which transmits and receives data. The primary computers in this network are the vehicle's electronic-control module (ECM) and power-control module (PCM). The ECM typically accesses computers and microcontrollers that monitor or control engine functions (e.g., the cruise-control module, spark controller, exhaust/gas recirculator). The PCM typically controls or monitors ECUs associated with the vehicle's power train (e.g., its engine, transmission, and braking systems).

When a vehicle is serviced, data from the standardized buss can be queried using external engine-diagnostic equipment (commonly called 'scan tools') that connect to the above-described 16-cavity electrical connector (called an OBD-II connector for vehicles made after 1996). The OBD-II connector is typically located under the vehicle's dashboard on the driver's side. Data transferred through the connector to the scan tool yields data that identify a status of the vehicle and whether or not a specific component of the vehicle has malfunctioned. This makes the service process more efficient and cost-effective.

Some manufacturers include complex electronic systems in their vehicles to access and analyze the above-described data. These systems are not connected through the OBD-II connector, but instead are wired directly to the vehicle's electronic system. This wiring process typically takes place when the vehicle is manufactured. In some cases these systems transmit data through a wireless network.

BRIEF SUMMARY OF THE INVENTION

It is an object of the present invention to address the limitations of the conventional engine-diagnostic systems discussed above. Specifically, it is an object of the invention to both access and send data over the ODB-II connector using a remote, wireless system that connects to the Internet using an airlink. The device used for accessing and transmitting the data is simple, low-cost, and easy-to-install.

In one aspect, the invention features a method and apparatus for remotely characterizing a vehicle's performance. The method features the steps of: i) generating data representative of the vehicle's performance with at least one microcontroller disposed within the vehicle; ii) transferring the data through an OBD, OBD-II or equivalent electrical connector to a data collector/router that includes a microprocessor and an electrically connected wireless transmitter; iii) transmitting a data packet representing the data with the wireless transmitter over an airlink, to a wireless communications system, and then to a host computer; and iv) analyzing the data packet with the host computer. Once analyzed, the data can be used to characterize the vehicle's performance, e.g. evaluate the vehicle's electrical and mechanical systems. The data can also be used for other purposes, such as for insurance-related issues, surveys, and vehicle tracking.

The terms 'microcontroller' and 'microprocessor' refer to standard electronic devices (e.g., programmable, silicon-based devices) that can control and/or process data. For example, a sensor disposed in the vehicle (e.g., an oxygen sensor) would be a microcontroller. "Airlink" refers to a standard wireless connection between a transmitter and a receiver.

In the above-described method, steps i)–iv) can be performed at any time and with any frequency, depending on the diagnoses being performed. For a 'real-time' diagnoses of a vehicle's engine performance, for example, the steps may be performed at rapid time or mileage intervals (e.g., several times each minute, or every few miles). Alternatively, other diagnoses (e.g. a 'smog check' that includes inferring the concentrations of hydrocarbons, oxides of nitrogen, or carbon monoxide) may require the steps to be performed only once each year or after a large number of miles are driven. Steps i)–iii) (i.e. the 'generating', 'transferring', and 'transmitting' steps) may be performed in response to a signal sent from the host computer to the vehicle. Alternatively, the vehicle may be configured to automatically perform these steps at predetermined or random time intervals.

The generating step typically includes generating data encoded in a digital format using the vehicle's electronic control unit (ECM) and/or power control unit (PCM). The data, for example, describes the vehicle's mileage, exhaust emissions, engine performance, engine temperature, coolant temperature, intake-manifold pressure, engine-performance tuning parameters, alarm status, accelerometer status, cruise-control status, fuel-injector performance, spark-plug timing, and/or a status of an anti-lock braking system. The data can also be a DTC or related code. The analyzing step features extracting data from the transmitted data packet, and then storing the data in a computer memory or database.

Once stored, the data is processed in a variety of ways. For example, the processing can simply involve determining the vehicle's odometer reading, and then comparing this reading to a schedule that lists recommended, mileage-dependent service events (e.g., a 5000-mile tune-up). Other algorithms include those that compare current data with data collected at an earlier time to dynamically characterize the performance of the vehicle. In another example, the algorithms compare the data with a predetermined numerical value or collection of values. For example, the data can correspond to a level of the vehicle's exhaust emissions or mileage; these values can then be compared to predetermined values for the particular vehicle to characterize its performance. More complex processing can include, for example, analyzing the data with a mathematical algorithm to predict the electrical or mechanical performance of the vehicle or a failure of a particular component.

After the processing step, the method can also include the step of sending an electronic text, data, or voice message to a computer, cellular telephone, personal digital assistant or wireless device to alert the end-user of a potential problem. The results from the analysis can also be displayed on similar devices connected to the World-Wide Web or the Internet.

In another embodiment, the method additionally includes the step of sending a second data packet from the host computer system over an airlink to the wireless communications system and then to the vehicle's data collector/router. In this case, the second data packet is processed by the microprocessor in the data collector/router to generate a signal that is sent to at least one of the vehicle's microcontrollers. There, the signal is processed and used, for example to adjust a setting in the particular microcontroller. The signal can also be used to update or distribute new software or firmware configurations to one or more of the vehicle's microcontrollers. In still other embodiments, the signal can be used to make 'tailored' readings of the vehicle's diagnostic information, e.g. to perform complex diagnoses (sometimes called 'drilling down') and isolate malfunctioning components in the vehicle's mechanical or electrical systems.

In another aspect, the invention features a method for sending data to an electrical system in a vehicle. The method features the steps of: i) generating with a host computer a data packet that affects at least one microcontroller disposed within the electrical system of the vehicle; ii) transmitting the data packet from the host computer over an airlink to a wireless communications system and then to a data collector/router (containing a microprocessor and wireless transmitter similar to that described above) disposed in the vehicle; iii) receiving the data packet with the wireless transmitter and sending it to the microprocessor; iv) processing the data packet with the microprocessor to generate data; and v) transmitting the data through an OBD, OBD-II or equivalent electrical connector to the microcontroller disposed within the vehicle's electrical system.

The invention has many advantages. In particular, wireless transmission of a vehicle's diagnostic data makes it possible to remotely identify potential problems without bringing the vehicle to a conventional service center. For example, the system can be configured so that when a DTC is generated by a vehicle the code associated with it is automatically sent to the web sites of a service center and the vehicle owner. This way, the service center can diagnose the problem, order to required parts, and schedule the service before the vehicle owner actually brings in the vehicle for service. In certain situations, potential problems with the vehicle can be remotely predicted and addressed before they actually occur. Moreover, data from the vehicle can be queried, stored and analyzed frequently and in real-time (i.e., while the vehicle is actually in use) to provide a relatively comprehensive diagnosis that is not possible in a conventional service center.

The device used to access and transmit the vehicle's data is small, low-cost, and can be easily installed in nearly every vehicle with an OBD-II connector in a matter of minutes. It can also be easily transferred from one vehicle to another, or easily replaced if it malfunctions.

Communication with the vehicle's OBD buss can also be bi-directional, making it possible to actually repair certain problems remotely. This, of course, means that in some cases the vehicle's problem can be both diagnosed and repaired in a completely remote and unobtrusive manner.

Data transmitted from the vehicle can also be analyzed for purposes unrelated to mechanical or electrical problems. For example, the data can be collected and analyzed in real-time to characterize driving patterns (e.g. a vehicle's speed), automotive part reliability, and emission characteristics. Lessors and renters of vehicles can remotely track mileage for billing purposes. Smog and emission certifications can be easily done in a completely remote manner. Data can also be analyzed to determine the vehicle's approximate location as a safety or anti-theft measure.

Another advantage of the invention is that data transmitted from a particular vehicle over a wireless airlink can be accessed and analyzed through the Internet without the need for expensive diagnostic equipment. Software used for the analysis can be easily modified and updated, and then used by anyone with access to the Internet. This obviates the need for vehicle service centers to upgrade their diagnostic equipment for next-generation vehicles. The resulting data, of course, have many uses for vehicle owners, surveyors of vehicle performance (e.g., J. D. Power), manufacturers of vehicles and related parts, and vehicle service centers.

Sophisticated analysis of the above-mentioned data yields information that benefits the consumer, vehicle and parts manufacturers, vehicle service centers, and the environment.

These and other advantages of the invention are described in the following detailed disclosure and in the claims.

BRIEF DESCRIPTION OF DRAWINGS

The features and advantages of the present invention can be understood by reference to the following detailed description taken with the drawings, in which.

DESCRIPTION OF THE PREFERRED EMBODIMENTS

Figure 1:
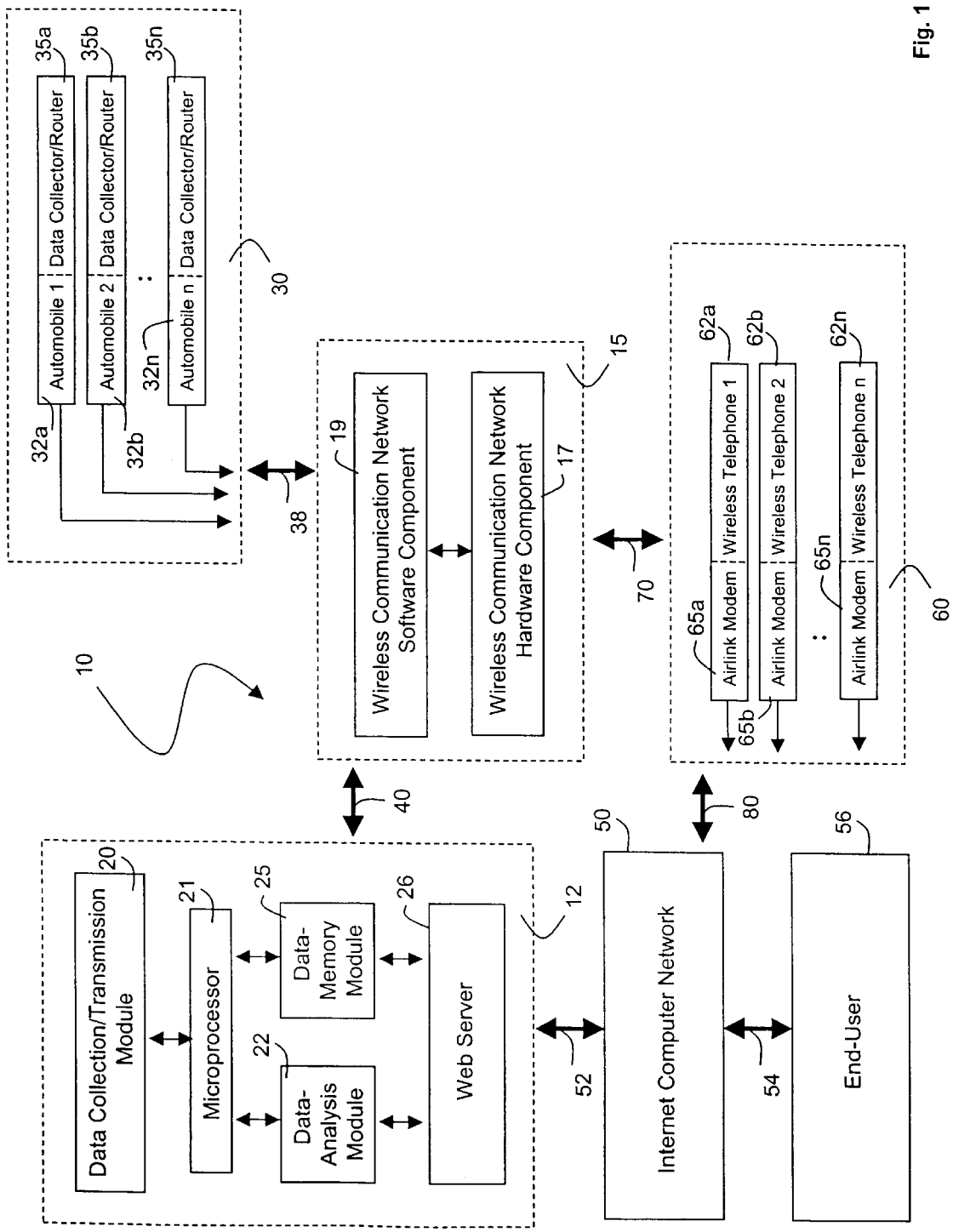
FIG. 1 is a schematic drawing of a wireless diagnostic system in wireless contact with a system of vehicles and the Internet.

FIG. 1 shows a wireless diagnostic system 10 that communicates with a collection of vehicles 30 using a host computer system 12 and a standard wireless communications system 15. The wireless communications system 15 is, e.g., a conventional wireless telephone or paging system (e.g., Bell South's 'Mobitex' System). Each vehicle 32a, 32b, 32n in the collection of vehicles 30 features a data collector/router 35a, 35b, 35n that queries data generated by each vehicle's ECU and OBD-II systems through an OBD buss. After the query, each data collector/router 35a, 35b, 35n receives data from the host vehicle 32a, 32b, 32n and sends it as a data packet over a wireless airlink 38 to the wireless communication system 15. The wireless communication system 15 features a standard hardware component 19 (e.g. a system of transmission 'bay stations', computers, and switching and routing hardware) and software component 17 (e.g., a paging or cellular network) that relay the data packet through a digital line 40 to the host computer system 12.

A data collection/transmission module 20 (e.g., a digital transmission line) in the host computer system 12 receives the data packet and then routes it to a microprocessor 21. The microprocessor controls a data-analysis module 22 (e.g., hardware and software for statistical analysis) that processes the data packet, and a data-memory module 25 (e.g., a computer memory or database) that stores it. A web server 26 receives the processed data from the data-analysis 22 and data-memory modules 25 and makes it available to an Internet computer network 50 through a first network connection 52. An end-user 56 accesses the data on the web server 26 through a second network connection 54 using the Internet computer network 50.

Data packets from each data collector/router 35a, 35b, 35n can also be accessed directly over an airlink 70 by wireless telephones 62a, 62b, 62n in a wireless telephone network 60. In this case each wireless telephone 62a, 62b, 62n has an airlink modem 65a, 65b, 65n that allows the data packet to be accessed directly. Alternatively, using the airlink modem 65a, 65b, 65n, the wireless telephones 62a, 62b, 62n can access processed data from the web server 26, provided they have the appropriate software (e.g., web-browsing capabilities). In this case, the web server 26 formats the data in a manner suitable to wireless browsing (e.g. wireless access protocol).

The host computer system 12 typically works bi-directionally, i.e. it can both send data to and receive data from the data collector/routers 35a, 35b, 35n present on each vehicle 32a, 32b, 32n. For example, following a query, the host computer system 12 receives a data packet from a particular data collector/router. The system typically runs a real-time operating system (e.g., Windows NT® or Unix®) that manages multiple software programs conducting different functions (e.g. data processing and storage).

Data is typically sent from the host vehicle 32a, 32b, 32n to each data collector/router 35a, 35b, 35n at a predetermined time interval (e.g. a random or periodic time interval) that is programmed in either the data collector/router or the actual vehicle. For example, data can be sent on a daily basis. Alternatively, data can be queried in response to a signal sent from the host computer system 12 to the data collector/routers 35a, 35b, 35n present on each vehicle 32a, 32b, 32n.

Depending on the make and model of the vehicle, the data packet can contain hundreds of datum that describe, e.g.: i) basic properties of the power train (e.g., emission levels, fuel-system status, engine temperature, speed and odometer readings, anti-lock brake status, RPMs, fuel and intake manifold pressure); and ii) manufacturer-specific information (e.g., status of the door locks, airbags, and entertainment center). In total, for most vehicles there are typically more than 300 datum that can be included in the data packet.

Certain vehicle functions can also be controlled by sending a data packet to the vehicle. Data in the data packet can adjust, for example, settings in the ECUs and OBD-II sensors, certain engine properties, and indicator lights on the vehicle's dashboard. They can also be used to open door locks and reconfigure the vehicle's entertainment system.

In addition, data packets routed through the wireless communications system 15 can be analyzed to determine the vehicle's approximate location. This can be done with relatively low accuracy (within a few miles) by simply recording the location of a specific cellular tower in the hardware component 17 of the wireless communications system 15 that routes the data packet to the host computer system 12. Recording the location of multiple bay stations within range of the vehicle, and then analyzing these data using conventional algorithms (e.g., triangulation), increases the accuracy to which the vehicle's location is determined.

Figure 2:
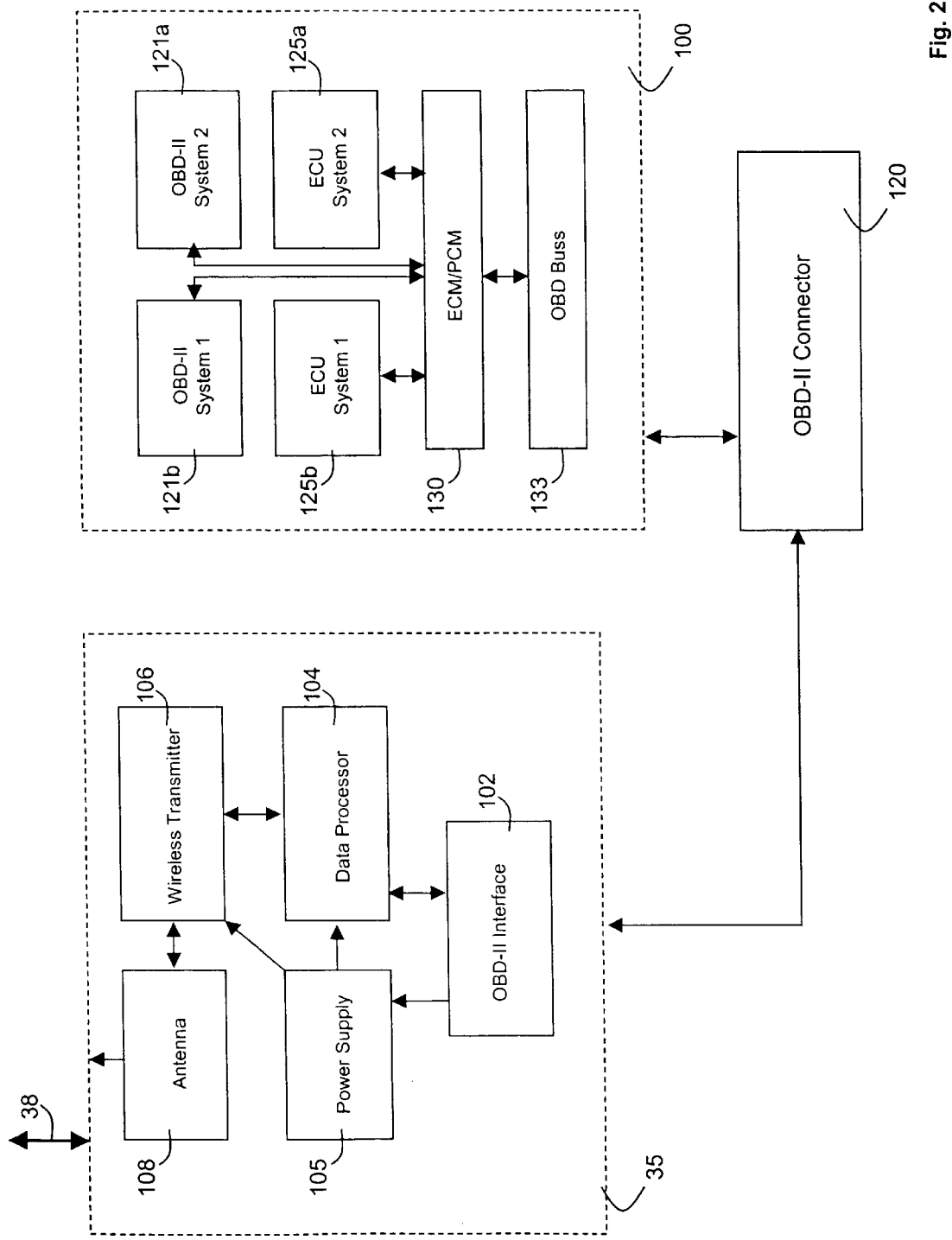
FIG. 2 is a schematic drawing of a data collector/router used in each of the vehicles of FIG. 1.

FIG. 2 shows a data collector/router 35 in electrical contact with a vehicle's OBD/ECU system 100. The two systems connect through a conventional OBD-II connector 120 typically located under the vehicle's dashboard. The data collector/router 35 is contained in a small, portable housing that plugs directly into the connector 120 and can be easily installed and replaced.

The connector 120 has a serial, 16-cavity layout, with specific electrical connections in separate cavities supplying data and electrical power from the OBD/ECU system 100.

The connector electrically and mechanically matches an OBD-II interface 102 in the data collector/router 35. Although the OBD-II connector 120 has a standard mechanical interface, data transmitted through it may have a format and pass through cavities that depend on the vehicle's make and model. For example, Ford and General Motors vehicles use an OBD data format called J1850; data in this format pass through cavities 2 and 10. Chrysler and most European and Asian manufacturers use a data format called ISO 9141-2 and pass data through cavities 7 and 15. In a third format, called J2284, data is passed through cavities 6 and 14.

The connector 120 also passes battery power (cavity 16), automobile chassis ground (cavity 4), and signal ground (cavity 5) from the OBD/ECU system 100 through the OBD-II interface 102 to the data collector/router 35. Using these connections, a power supply 105 receives the battery power, regulates it, and in turn drives a data processor 104 and wireless transmitter 106 within the data collector/router 35.

Once received, data is passed to the data processor 104 (e.g., a microprocessor) that processes and formats it to form a data packet. As an example, a data packet and specifically formatted for Bell South's wireless 900 MHz Mobitex MPAK system is described in Table below. Actual data describing the host vehicle is contained in the 516-byte data area described in Table 1.

TABLE 1 description of Mobitex MPAK data packet

| Bytes | General Description | |
|---|---|---|
| 3 | source MAN (unique 24-Bit modem number) | |
| 3 | destination MAN (unique 24-Bit modem number) | |
| 1 | when sending: | Bit 0 = use mailbox |
| | | Bit 1 = return positive acknowledgment |
| | | Bit 2 = use address list |
| | | Bits 3–7 = 0 |
| | when receiving: | Bit 4 = may be ignored |
| | | Bits 5–7 = traffic state |
| 1 | MPAK type | |
| 0 or 22 | address list | |
| 0 to 512 | data payload | |

Once properly formatted as described in Table 1, the data packet is passed from the data processor 104 to the wireless transmitter 106. The transmitter 106 transmits the data packet through a conventional wireless antenna 108 over an airlink 38 to a wireless communications system (15) shown in FIG. 1. The data processor 104 formats the data packet according to the wireless communications system that transmits it.

Once transmitted, the data packet propagates through the wireless communication software and hardware components (17 and 19 in FIG. 1) of the communication network (e.g., the Mobitex network). Typically in this case the data packet is routed to a 'point of presence' or 'POP' in the network, where it is then transferred over a digital line (e.g., 40 in FIG. 1) to the host computer system.

The data area described in Table 1 contains data generated by the vehicle's OBD/ECU system 100. As described above, this system 100 functions effectively as an on-board computer network that generates, transmits, and receives data. For simplicity, the system 100 in FIG. 2 contains two OBD-II systems. 121a, 121b and two ECU systems 125a, 125b; it is analogous to more complex OBD-II and ECU systems employed in actual vehicles. The OBD-II systems 121a, 121b are microcontrollers that monitor the various vehicle-related properties described above. The ECU systems 125a, 125b receive and send data to electromechanical actuators that control, e.g., fuel-injector pulses, spark-plug timing, and anti-lock braking systems.

The OBD-II systems 121a, 121b and ECU systems 125a, 125b are controlled by the vehicle's ECM/PCM 130. In some cases, the ECM/PCM 130 receives data from these systems and routes it over a shared electronic OBD buss 133. Alternatively, after receiving the data the ECM/PCM 130 converts it to "fail" or "malfunction" codes that are then routed over the shared electronic buss 133. In both cases, the OBD buss serially transmits data to the data collector/router 35 through the electrically connected OBD connector 120.

Figure 3:
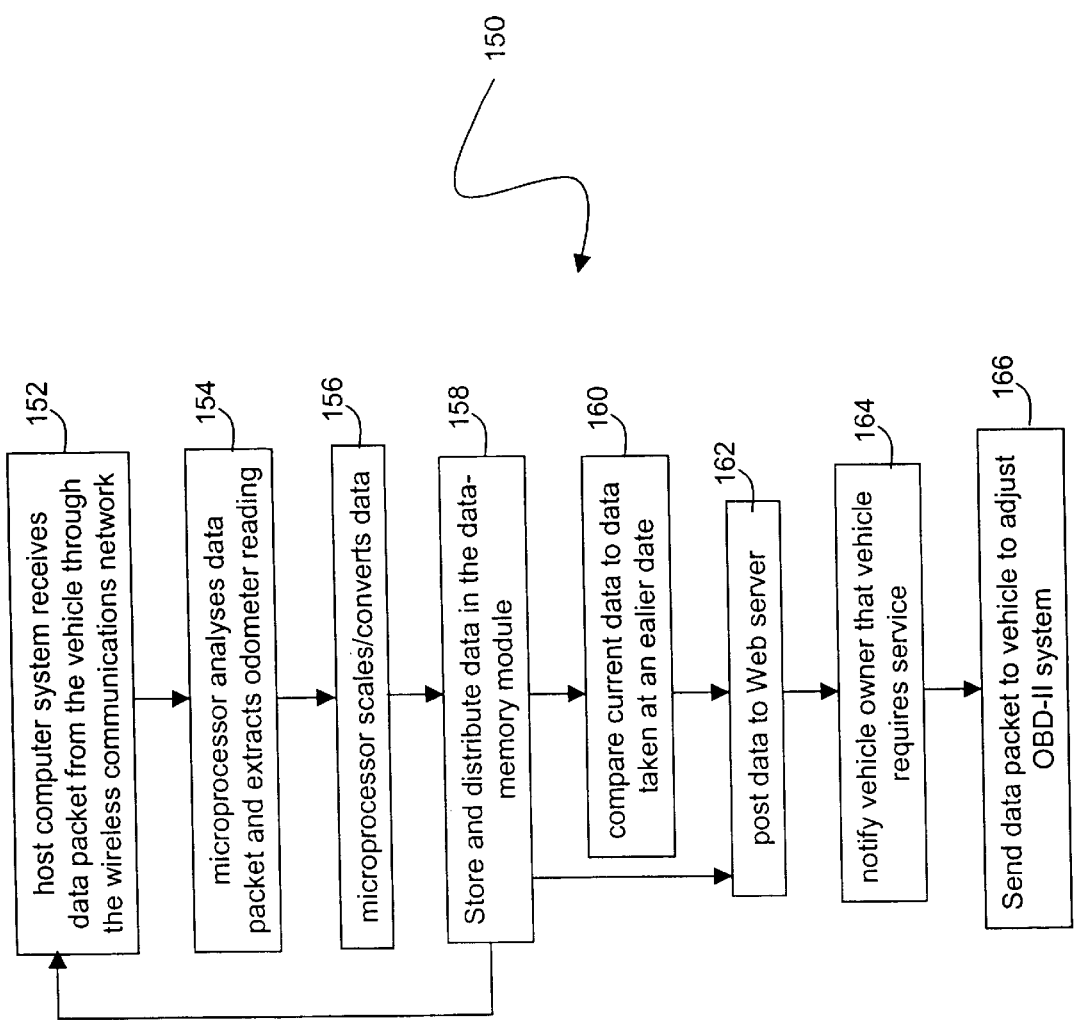
FIG. 3 is a flow chart describing analysis of data transmitted by the data collector/router by the host computer of FIG. 1.

Once collected and sent to the host computer system (12 in FIG. 1), the data packet can be analyzed in a variety of different ways. As an example, FIG. 3 shows a flow chart describing one method 150 of how data is analyzed and then made available to end-users through the Internet. A wide number of different data-analysis methods are possible; the one shown in FIG. 3 was chosen because of its simplicity.

In the data-analysis method 150, the host computer system receives a data packet from the vehicle through the wireless communications network (step 152). The data packet has a format shown, e.g., in Table 1 above, and contains a wide range of information that characterizes the vehicle's performance. Once received, the packet is analyzed and an odometer reading (e.g., mileage) from the vehicle is extracted (step 154). If necessary, the microprocessor then scales the odometer reading (e.g., converts kilometers to miles) or converts the format used in the data packet (e.g., a manufacturer-specific format) to one that is easily recognized by the end-user (step 156). At this point the odometer reading and other data within the data packet are distributed and stored in the data-memory module (e.g. a database) of the host computer system (step 158). Some data may be simply disregarded during this step. This portion (steps 152, 154, 156, and 158) of the method may be repeated at this point to generate additional data.

All the data (e.g. the vehicle's mileage collected at different time or mileage intervals) can be posted directly on a Web page on the Web server (step 162) where it is accessible by the end-user through the Internet. The data can also be analyzed further. For example, a current odometer reading can be compared to one recorded at an earlier date (step 160) to determine how many miles the vehicle has traveled since its last oil change. If this value exceeds that recommended for the particular vehicle, the host computer system can notify the user through electronic mail that the vehicle requires service (step 164). The method 150 can also be used to remotely adjust settings in the vehicle's OBD-II systems. For example, at this point the host computer system could send a data packet to the vehicle to reset the trip odometer to a new value (step 166).

Figure 4:
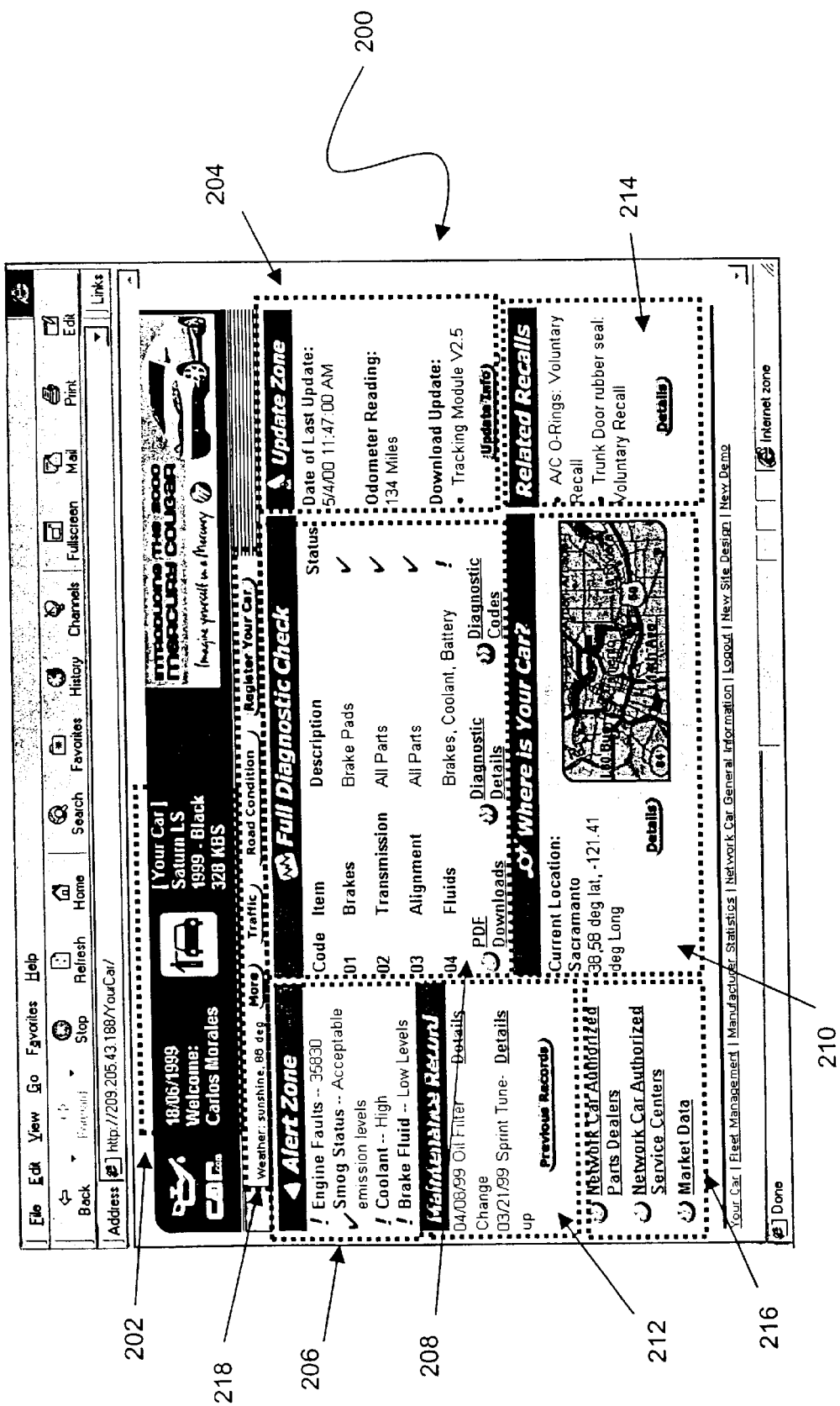
FIG. 4 is a screen capture of a page from the Web server of FIG. 1.

FIG. 4 shows a sample Web page 200 from a Web server that displays data processed using a method similar to that shown in FIG. 3. Access to Web page is typically password-protected, thereby only allowing end-users with the correct password to access data for a particular vehicle.

The Web page 200 features a region 202 that describes the owner of the vehicle and its make and model. The page 200 also has a region 204 that describes the time, date, and odometer readings registered at its last update. Data describing vehicle problems (e.g., engine faults, coolant and brake fluid levels, emission status) that may require immediate attention are displayed in region 206. Data used to diagnose the overall condition of the vehicle (e.g., brake and transmission status, wheel alignment) are displayed in region 208. More data relating to these properties can be obtained by clicking the appropriate buttons ("Diagnostic Details", "Diagnostic Codes") in this region. The page 200 also includes a region 210 that provides the approximate location of the vehicle. As described above, the vehicle's location is determined by recording the location of one or more bay stations used to send the latest data packet through the wireless communications system. The page also includes a region 212 that features data describing the general history and maintenance of the vehicle. A related region 214 describes parts for the particular vehicle that have been recently recalled. A region 216 describes the locations of parts dealers and local service stations for the particular vehicle, while the region 218 provides access to features that may affect travel, such as weather, traffic, road conditions, and the status of the vehicle's registration.

Other embodiments are within the scope of the invention. For example, the components used in the data collector/router (particularly the wireless transmitter) may be optimized for different types of wireless communications systems. These systems include wireless telephone and paging systems, Bluetooth®, and similar systems. Similarly, the format of the data packet may also be adjusted for transmission over different types of networks. In general, any components in the data collector/router, and any format of the data packet, can be used to accomplish the general method of the invention.

Likewise, a wide range of mathematical algorithms can be used to analyze data once it is extracted from the data packets. These algorithms range from the relatively simple (e.g., lessors and renters determining the mileage on a vehicle for billing purposes) to the complex (e.g., predictive engine diagnoses using 'data mining' techniques). Data analysis may be used to characterize an individual vehicle as described above, or a collection of vehicles. Algorithms used to characterize a collection of vehicles can be used, for example, for remote vehicle or parts surveys, to characterize emission performance in specific geographic locations, or to characterize traffic.

Other embodiments of the invention include algorithms for analyzing data to characterize vehicle accidents and driving patterns for insurance purposes; algorithms for determining driving patterns for use-based leasing; and algorithms for recording vehicle use and driving patterns for tax purposes. In general, any algorithm that processes data collected with the above-described method is within the scope of the invention.

Similarly, the temporal or mileage frequency at which data is collected can be adjusted to diagnose specific types of problems. For example, characterization of certain types of vehicle performance indicators, such as emissions, may need to be monitored relatively frequently. Other properties, such as mileage and fluid levels, may only need to be monitored every few days, or in some cases just a few times each year.

Once the data is analyzed, the Web page used to display the data can take many different forms. Different Web pages may be designed and accessed depending on the end-user. For example, individual users may have access to Web pages for their particular vehicle. Conversely, vehicle service providers (e.g. providers that change oil or certify a vehicle's emissions) may have access to Web pages that contain data (e.g., mileage and emissions data) from a wide range of vehicles. These data, for example, can be sorted and analyzed depending on vehicle make, model, and geographic location. Web pages may also be formatted using standard wireless access protocols (WAP) so that they can be accessed using wireless devices such as cellular telephones, personal digital assistants (PDAs), and related devices.

In other embodiments, additional hardware can be added to the in-vehicle unit. For example, hardware for global-positioning systems (GPS) may be added so that the location of the vehicle can be monitored along with its data.

In other embodiments, data from the data collector/router in the vehicle can be analyzed and used for: remote billing/payment of tolls; remote smog and emissions checks; remote payment of parking/valet services; remote control of the vehicle (e.g., in response to theft or traffic/registration violations); and general survey information.

Still other embodiments are within the scope of the following claims.

What is claimed is:

1. A method for characterizing a vehicle's performance, comprising:
    (a) retrieving data representative of the vehicle's performance, through the vehicle's OBD or OBD-II connector, according to a communication protocol, at a predetermined time interval, and with a data collector, the data collector comprising,
        i) an electrical connector configured to connect to the OBD or OBD-II connector,
        ii) a microprocessor interfaced with the electrical connector and configured to retrieve and transmit data at the predetermined time interval, and
        iii) a wireless transmitter interfaced with the microprocessor; and
    (b) wirelessly transmitting the data with the wireless transmitter.

2. The method of claim 1, wherein the data is serially transferred through an OBD-II connector to the data collector.

3. The method of claim 2, wherein the protocol used to transfer data through the OBD-II connector is J1850, ISO 9141-2, or J2284.

4. The method of claim 1, wherein the retrieving data comprises retrieving data encoded in a digital format using an electronic control unit or power control unit.

5. The method of claim 1, wherein the retrieved data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system.

6. The method of claim 1, further comprising wirelessly receiving data configured to adjust a setting in a diagnostic system of the vehicle.

7. The method of claim 1, wherein the vehicle is selected from a group comprising an automobile, truck, wheeled commercial equipment, heavy truck, power sport vehicle, collision repair vehicle, marine vehicle, and recreational vehicle.

8. The method of claim 1, further comprising wirelessly transmitting location data representative of the vehicle's location with the wireless transmitter.

9. The method of claim 8, wherein the location data includes global positioning system (GPS) data.

10. The method of claim 1, wherein the predetermined time interval is programmable.

11. The method of claim 1, wherein the retrieving data or wirelessly transmitting data is automatically performed at a configurable predetermined or random time interval.

12. The method of claim 1, further comprising wirelessly receiving data configured to modify a software or firmware configuration in the vehicle.

13. A system for characterizing a vehicle's performance, comprising:
(a) a data collector/router comprising,
 (i) an electrical connector configured to connect to the vehicle's OBD or OBD-II connector;
 (ii) a microprocessor interfaced with the electrical connector, the microprocessor configured to retrieve data generated by the vehicle at a predetermined time interval; and
 (iii) a wireless transmitter configured to receive the data from the microprocessor and wirelessly transmit the data; and
(b) a location-determining component configured to determine location data representative of the vehicle's location, wherein the wireless transmitter is configured to receive the location data and wirelessly transmit the location data; and
(c) a wireless receiver configured to receive (1) data configured to adjust a setting in a diagnostic system of the vehicle and (2) data configured to modify a software or firmware configuration in the vehicle,
wherein the retrieved data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system,
wherein the microprocessor is configured to retrieve data at a configurable predetermined or random time interval,
wherein the wireless transmitter is configured to transmit data at a configurable predetermined or random time interval,
wherein the location data includes global positioning system (GPS) data,
wherein the data collector/router is configured to serially transfer data through an OBD-II connector to the data collector/router, and
wherein the data collector/router is configured to transfer data using a J1850, ISO 9141-2, or J2284 protocol.

14. A system for characterizing a vehicle's performance, comprising:
(a) a data collector/router comprising,
 (i) an electrical connector configured to connect to the vehicle's OBD or OBD-II connector;
 (ii) a microprocessor interfaced with the electrical connector, the microprocessor configured to retrieve data generated by the vehicle at a predetermined time interval; and
 (iii) a wireless transmitter configured to receive the data from the microprocessor and wirelessly transmit the data.

15. The system of claim 14, wherein the data collector/router is configured to serially transfer data through an OBD-II connector to the data collector/router.

16. The system of claim 15, wherein the data collector/router is configured to transfer data using a J1850, ISO 9141-2, or J2284 protocol.

17. The system of claim 14, further comprising a wireless receiver configured to receive data configured to adjust a setting in a diagnostic system of the vehicle.

18. The system of claim 14, wherein the vehicle is selected from a group comprising an automobile, truck, wheeled commercial equipment, heavy truck, power sport vehicle, collision repair vehicle, marine vehicle, and recreational vehicle.

19. The system of claim 14, further comprising a location-determining component configured to determine location data representative of the vehicle's location, wherein the wireless transmitter is configured to receive the location data and wirelessly transmit the location data.

20. The system of claim 19, wherein the location data includes global positioning system (GPS) data.

21. The system of claim 14, further comprising a wireless receiver configured to receive data configured to modify a software or firmware configuration in the vehicle.

22. The system of claim 14, wherein the microprocessor is configured to retrieve data at a configurable predetermined or random time interval.

23. The system of claim 14, wherein the wireless transmitter is configured to transmit data at a configurable predetermined or random time interval.

24. The system of claim 14, wherein the retrieved data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system.

25. A method executed by a programmable host computer to characterize a vehicle's performance, the method comprising:
(a) wirelessly receiving, by the host computer, a first set of data representative of the vehicle's performance;
(b) wirelessly receiving, by the host computer, a second set of data representative of the vehicle's location;
(c) analyzing the first and second sets of data with the host computer to generate analyzed data, wherein the analyzing includes applying at least one algorithm to at least a portion of the first and second sets of data; and
(d) displaying the analyzed data on at least one web page accessible on the Internet,
wherein the displayed analyzed data includes at least one map representation depicting a current location of the vehicle, and
wherein the at least one web page includes a plurality of regions associated with respective analyzed data.

26. The method of claim 25, wherein the displayed analyzed data includes vehicle location information in degrees latitude and longitude.

27. The method of claim 25, wherein the second set of data is provided, at least in part, from a global positioning system (GPS) component in the vehicle.

28. The method of claim 25, wherein the at least one web page is associated with an individual user or vehicle service provider.

29. The method of claim 25, wherein the at least one web page displays analyzed data associated with a plurality of vehicles.

30. The method of claim 25, wherein the vehicle is selected from a group comprising an automobile, truck, wheeled commercial equipment, heavy truck, power sport vehicle, collision repair vehicle, marine vehicle, and recreational vehicle.

31. The method of claim 25, wherein the analyzing the data includes extracting data from a data packet corresponding to a specific property of the vehicle and storing the data in a computer memory or database.

32. The method of claim 25, wherein the algorithm is used to at least in part characterize or predict electrical or mechanical performance of the vehicle.

33. The method of claim 25, wherein the analyzing the data includes comparing the data with data collected at an earlier time to characterize or predict performance of the vehicle.

34. The method of claim 25, wherein the analyzing the data includes comparing the data with a predetermined numerical value or collection of values to characterize performance of the vehicle.

35. The method of claim 25, wherein the data corresponds at least in part to a level of exhaust emissions for the vehicle, and the analyzing the data comprises comparing the level of exhaust emissions to a predetermined value for the particular vehicle to characterize performance of the vehicle.

36. The method of claim 25, wherein the data corresponds to a mileage for the vehicle, and the analyzing the data comprises comparing the mileage to a predetermined value for the particular vehicle to characterize performance of the vehicle.

37. The method of claim 25, further comprising sending an electronic text, data, or voice message to a computer, cellular telephone, or wireless device after the analyzing of the data.

38. The method of claim 25, further comprising wirelessly transmitting data to the vehicle, the transmitted data configured to adjust a setting in a diagnostic system of the vehicle.

39. The method of claim 25, wherein the first set of data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system.

40. The method of claim 25, further comprising storing the analyzed data in at least one database, the database associated with at least one of insurance, vehicle driving pattern monitoring, emission characteristics, a performance or reliability survey, vehicle tracking, and billing of a user of the vehicle.

41. The method of claim 25, wherein the analyzing the data includes inferring a concentration of hydrocarbons, oxides of nitrogen, and carbon monoxide emitted from the vehicle.

42. The method of claim 25, wherein the analyzing the data includes:
   (i) estimating the vehicle's odometer reading;
   (ii) comparing the odometer reading to a schedule indicative of at least one service event associated with mileage; and
   (iii) based on the comparing, sending a notification if a service event is recommended for the vehicle.

43. The method of claim 25, further comprising wirelessly transmitting data configured to modify a software or firmware configuration in the vehicle.

44. The method of claim 25, wherein the at least one web page provides access to analysis software executable by a user, wherein the analysis software is remote from the user.

45. The method of claim 25, wherein the analyzing the data includes:
   (i) remotely identifying a problem condition in the vehicle, wherein the vehicle is located at a location remote from a service entity; and
   (ii) sending a message to at least one of the service entity and an owner of the vehicle, wherein the message is associated with the identified problem condition.

46. The method of claim 45, wherein the sending a message comprises updating a web page associated with the service entity or owner.

47. The method of claim 45, wherein the problem condition relates to an existing problem.

48. The method of claim 45, wherein the problem condition relates to a predicted problem.

49. The method of claim 25, wherein the analyzing the data comprises:
   (i) remotely identifying a problem condition in the vehicle; and
   (ii) remotely repairing the vehicle to correct the problem condition,
      wherein the vehicle is located at a location remote from a service entity.

50. The method of claim 25, wherein the analyzing the data comprises:
   (i) determining a location of the vehicle; and
   (ii) activating a safety or anti-theft function associated with the determined location.

51. A programmable host computer for characterizing a vehicle's performance, comprising:
   (a) a data collection component configured to receive data sent wirelessly by the vehicle, the received data including a first set of data representative of the vehicle's performance and a second set of data representative of the vehicle's location;
   (b) a data transmission component configured to wirelessly transmit data;
   (c) a data analysis component configured to analyze the first and second sets of data to generate analyzed data, wherein the data analysis component is configured to apply at least one algorithm to at least a portion of the first and second sets of data; and
   (d) a web display component configured to provide the analyzed data for display on at least one web page accessible on the Internet,
   wherein the displayed analyzed data includes at least one map representation depicting a current location of the vehicle, and
   wherein the at least one web page includes a plurality of regions associated with respective analyzed data.

52. The programmable host computer of claim 51, wherein the web display component comprises a web server.

53. The programmable host computer of claim 51, further comprising a data memory component configured to store at least a portion of the received or analyzed data.

54. The programmable host computer of claim 53, wherein the data memory component comprises a database.

55. The programmable host computer of claim 51, wherein the displayed analyzed data includes vehicle location information in degrees latitude and longitude.

56. The programmable host computer of claim 51, wherein the second set of data is provided, at least in part, from a global positioning system (GPS) component in the vehicle.

57. The programmable host computer of claim 51, wherein the at least one web page is associated with an individual user or vehicle service provider.

58. The programmable host computer of claim 51, wherein the at least one web page displays analyzed data associated with a plurality of vehicles.

59. The programmable host computer of claim 51, wherein the vehicle is selected from a group comprising an automobile, truck, wheeled commercial equipment, heavy truck, power sport vehicle, collision repair vehicle, marine vehicle, and recreational vehicle.

60. The programmable host computer of claim 51, wherein the data analysis component is configured to extract data from a data packet corresponding to a specific property of the vehicle and to store the data in a computer memory or database.

61. The programmable host computer of claim 51, wherein the algorithm is used to at least in part characterize or predict electrical or mechanical performance of the vehicle.

62. The programmable host computer of claim 51, wherein the data analysis component is configured to compare at least a portion of the received data with data collected at an earlier time to characterize or predict performance of the vehicle.

63. The programmable host computer of claim 51, wherein the data analysis component is configured to compare at least a portion of the received data with a predetermined numerical value or collection of values to characterize performance of the vehicle.

64. The programmable host computer of claim 51, wherein at least a portion of the received data corresponds at least in part to a level of exhaust emissions for the vehicle, and the data analysis component is configured to compare the level of exhaust emissions to a predetermined value for the particular vehicle to characterize performance of the vehicle.

65. The programmable host computer of claim 51, wherein at least a portion of the received data corresponds to a mileage for the vehicle, and the data analysis component is configured to compare the mileage to a predetermined value for the particular vehicle to characterize performance of the vehicle.

66. The programmable host computer of claim 51, wherein the data transmission component is configured to send an electronic text, data, or voice message to a computer, cellular telephone, or wireless device responsive to an output of the data analysis component.

67. The programmable host computer of claim 51, wherein the first set of data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system.

68. The programmable host computer of claim 51, further comprising a data storage component configured to store the analyzed data in at least one database, the database associated with at least one of insurance, vehicle driving pattern monitoring, emission characteristics, a performance or reliability survey, vehicle tracking, and billing of a user of the vehicle.

69. The programmable host computer of claim 51, wherein the data analysis component is configured to infer a concentration of hydrocarbons, oxides of nitrogen, and carbon monoxide emitted from the vehicle.

70. The programmable host computer of claim 51, wherein the data analysis component is configured to:
   (i) estimate the vehicle's odometer reading;
   (ii) compare the odometer reading to a schedule indicative of at least one service event associated with mileage; and
   (iii) based on the comparing, send a notification if a service event is recommended for the vehicle.

71. The programmable host computer of claim 51, wherein the data transmission component is configured to wirelessly transmit data configured to modify a software or firmware configuration in the vehicle.

72. The programmable host computer of claim 51, wherein the at least one web page provides access to analysis software executable by a user, wherein the analysis software is remote from the user.

73. The programmable host computer of claim 51, wherein the data analysis component is configured to:
   (i) remotely identify a problem condition in the vehicle, wherein the vehicle is located at a location remote from a service entity; and
   (ii) send a message to at least one of the service entity and an owner of the vehicle, wherein the message is associated with the identified problem condition.

74. The programmable host computer of claim 73, wherein a web page associated with the service entity or owner is updated.

75. The programmable host computer of claim 73, wherein the problem condition relates to an existing problem.

76. The programmable host computer of claim 73, wherein the problem condition relates to a predicted problem.

77. The programmable host computer of claim 51, wherein the data analysis component is configured to:
   (i) remotely identify a problem condition in the vehicle; and
   (ii) remotely repair the vehicle to correct the problem condition,
      wherein the vehicle is located at a location remote from a service entity.

78. The programmable host computer of claim 51, wherein the data analysis component is configured to:
   (i) determine a location of the vehicle; and
   (ii) activate a safety or anti-theft function associated with the determined location.

79. The programmable host computer of claim 51, wherein the wireless transmission component is configured to transmit data to the vehicle which adjusts at least one setting in a diagnostic system of the vehicle.

80. A machine-readable medium including instructions for performing a method for a programmable host computer to characterize a vehicle's performance, said medium comprising:
   (a) instructions for wirelessly receiving, by the host computer and from the vehicle, a first set of data representative of the vehicle's performance;
   (b) instructions for wirelessly receiving, by the host computer and from the vehicle, a second set of data representative of the vehicle's location;
   (c) instructions for analyzing the first and second sets of data with the host computer to generate analyzed data, wherein the analyzing includes applying at least one algorithm to at least a portion of the first and second sets of data; and
   (d) instructions for displaying the analyzed data on at least one web page accessible on the Internet,
   wherein the displayed analyzed data includes at least one map representation depicting a current location of the vehicle, and wherein the at least one web page includes a plurality of regions associated with respective analyzed data.

81. The machine-readable medium of claim 80, wherein the displayed analyzed data includes vehicle location information in degrees latitude and longitude.

82. The machine-readable medium of claim 80, wherein the second set of data is provided, at least in part, from a global positioning system (GPS) component in the vehicle.

83. The machine-readable medium of claim 80, wherein the at least one web page is associated with an individual user or vehicle service provider.

84. The machine-readable medium of claim 80, wherein the at least one web page displays analyzed data associated with a plurality of vehicles.

85. The machine-readable medium of claim 80, wherein the vehicle is selected from a group comprising an automobile, truck, wheeled commercial equipment, heavy truck, power sport vehicle, collision repair vehicle, marine vehicle, and recreational vehicle.

86. The machine-readable medium of claim 80, wherein the instructions for analyzing the data include instructions for extracting data from a data packet corresponding to a specific property of the vehicle and storing the data in a computer memory or database.

87. The machine-readable medium of claim 80, wherein the algorithm is used to at least in part characterize or predict electrical or mechanical performance of the vehicle.

88. The machine-readable medium of claim 80, wherein the instructions for analyzing the data include instructions for comparing the data with data collected at an earlier time to characterize or predict performance of the vehicle.

89. The machine-readable medium of claim 80, wherein the instructions for analyzing the data include instructions for comparing the data with a predetermined numerical value or collection of values to characterize performance of the vehicle.

90. The machine-readable medium of claim 80, wherein the data corresponds at least in part to a level of exhaust emissions for the vehicle, and the instructions for analyzing the data comprise instructions for comparing the level of exhaust emissions to a predetermined value for the particular vehicle to characterize performance of the vehicle.

91. The machine-readable medium of claim 80, wherein the data corresponds to a mileage for the vehicle, and the instructions for analyzing the data comprise instructions for comparing the mileage to a predetermined value for the particular vehicle to characterize performance of the vehicle.

92. The machine-readable medium of claim 80, further comprising instructions for sending an electronic text, data, or voice message to a computer, cellular telephone, or wireless device after analysis of the data.

93. The machine-readable medium of claim 80, further comprising instructions for wirelessly transmitting data to the vehicle, the transmitted data configured to adjust a setting in a diagnostic system of the vehicle.

94. The machine-readable medium of claim 80, wherein the first set of data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system.

95. The machine-readable medium of claim 80, further comprising instructions for storing the analyzed data in at least one database, the database associated with at least one of insurance, vehicle driving pattern monitoring, emission characteristics, a performance or reliability survey, vehicle tracking, and billing of a user of the vehicle.

96. The machine-readable medium of claim 80, wherein the instructions for analyzing the data include instructions for inferring a concentration of hydrocarbons, oxides of nitrogen, and carbon monoxide emitted from the vehicle.

97. The machine-readable medium of claim 80, wherein the instructions for analyzing the data include:
(i) instructions for estimating the vehicle's odometer reading;
(ii) instructions for comparing the odometer reading to a schedule indicative of at least one service event associated with mileage; and
(iii) instructions for, based on the comparing, sending a notification if a service event is recommended for the vehicle.

98. The machine-readable medium of claim 80, further comprising instructions for wirelessly transmitting data configured to modify a software or firmware configuration in the vehicle.

99. The machine-readable medium of claim 80, wherein the at least one web page provides access to analysis software executable by a user, wherein the analysis software is remote from the user.

100. The machine-readable medium of claim 80, wherein the instructions for analyzing the data include:
(i) instructions for remotely identifying a problem condition in the vehicle, wherein the vehicle is located at a location remote from a service entity; and
(ii) instructions for sending a message to at least one of the service entity and an owner of the vehicle, wherein the message is associated with the identified problem condition.

101. The machine-readable medium of claim 100, wherein the instructions for sending a message comprise instructions for updating a web page associated with the service entity or owner.

102. The machine-readable medium of claim 100, wherein the problem condition relates to an existing problem.

103. The machine-readable medium of claim 100, wherein the problem condition relates to a predicted problem.

104. The machine-readable medium of claim 80, wherein the instructions for analyzing the data comprise:
(i) instructions for remotely identifying a problem condition in the vehicle; and
(ii) instructions for remotely repairing the vehicle to correct the problem condition,
wherein the vehicle is located at a location remote from a service entity.

105. The machine-readable medium of claim 80, wherein the instructions for analyzing the data comprise:
(i) instructions for determining a location of the vehicle; and
(ii) instructions for activating a safety or anti-theft function associated with the determined location.

106. A graphical user interface for displaying performance and location information for a vehicle, the interface comprising:
a plurality of regions, each region displaying analyzed data for the vehicle,
wherein at least one region includes data representative of the vehicle's performance,
wherein at least one region includes data representative of a location of the vehicle, and wherein the plurality of regions are displayed on at least one web page accessible on the Internet.

107. The graphical user interface of claim 106, wherein the displayed analyzed data includes at least one map associated with the location data.

108. The graphical user interface of claim 106, wherein the displayed analyzed data includes vehicle location information in degrees latitude and longitude.

109. The graphical user interface of claim 106, wherein the displayed analyzed data includes data representing at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system.

110. The graphical user interface of claim 106, wherein the at least one web page is associated with an individual user or vehicle service provider.

111. The graphical user interface of claim 106, wherein the at least one web page displays analyzed data associated with a plurality of vehicles.

112. The graphical user interface of claim 106, wherein the vehicle is selected from a group comprising an automobile, truck, wheeled commercial equipment, heavy truck, power sport vehicle, collision repair vehicle, marine vehicle, and recreational vehicle.

113. The graphical user interface of claim 106, wherein access to the graphical user interface is password-protected.

114. The graphical user interface of claim 106, wherein the displayed analyzed data includes information associated with at least one problem condition.

115. A motor vehicle for use in cooperation with a programmable central computer, comprising:

(a) an engine;

(b) a transmission;

(c) a braking mechanism;

(d) an onboard diagnostic system having an OBD or OBD-II connector, the diagnostic system configured to query at least data relating to the engine, transmission, and braking mechanism;

(e) a data collector/router comprising, (i) an electrical connector configured to connect to the OBD or OBD-II connector, (ii) a microprocessor interfaced with the electrical connector, the microprocessor configured to retrieve data generated by the vehicle at a predetermined time interval, and (iii) a wireless transmitter configured to receive the data from the microprocessor and wirelessly transmit the data; and (f) a location-determining component configured to determine location data representative of the vehicle's location, wherein the wireless transmitter is configured to receive the location data and wirelessly transmit the location data; and (g) a wireless receiver configured to receive (1) data configured to adjust a setting in a diagnostic system of the vehicle and (2) data configured to modify a software or firmware configuration in the vehicle, wherein the retrieved data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system, wherein the microprocessor is configured to retrieve data at a configurable predetermined or random time interval, wherein the location data includes global positioning system (GPS) data, wherein the data collector/router is configured to serially transfer data through an OBD-II connector to the data collector/router, and wherein the data collector/router is configured to transfer data using a J1850, ISO 9141-2, or J2284 protocol.

116. The motor vehicle of claim 115, wherein the vehicle is selected from a group comprising an automobile, truck, wheeled commercial equipment, heavy truck, power sport vehicle, collision repair vehicle, marine vehicle, and recreational vehicle.

* * * * *

US006732031C1

(12) EX PARTE REEXAMINATION CERTIFICATE (9357th)

United States Patent
Lightner et al.

(10) Number: US 6,732,031 C1
(45) Certificate Issued: *Oct. 9, 2012

(54) WIRELESS DIAGNOSTIC SYSTEM FOR VEHICLES

(75) Inventors: Bruce Lightner, La Jolla, CA (US); Diego Botrego, San Diego, CA (US); Chuck Myers, La Jolla, CA (US); Larkin Hill Lowrey, La Jolla, CA (US)

(73) Assignee: Morgan Stanley & Co., Incorporated, New York, NY (US)

Reexamination Request:
No. 90/011,307, Dec. 2, 2010

Reexamination Certificate for:
Patent No.: 6,732,031
Issued: May 4, 2004
Appl. No.: 10/447,713
Filed: May 29, 2003

( * ) Notice: This patent is subject to a terminal disclaimer.

Related U.S. Application Data

(63) Continuation of application No. 09/776,106, filed on Feb. 1, 2001, now Pat. No. 6,636,790.

(60) Provisional application No. 60/222,152, filed on Aug. 1, 2000, provisional application No. 60/222,213, filed on Aug. 1, 2000, provisional application No. 60/220,986, filed on Jul. 25, 2000.

(51) Int. Cl.
*G01M 15/04* (2006.01)
*G01M 15/10* (2006.01)

(52) U.S. Cl. ............... 701/31.4; 701/34.3; 701/34.4

(58) Field of Classification Search .............. None
See application file for complete search history.

(56) References Cited

To view the complete listing of prior art documents cited during the proceeding for Reexamination Control Number 90/011,307, please refer to the USPTO's public Patent Application Information Retrieval (PAIR) system under the Display References tab.

*Primary Examiner* — Zoila Cabrera

(57) ABSTRACT

The invention features a method and apparatus for remotely characterizing a vehicle's performance. The method features the steps of: i) generating data representative of the vehicle's performance with at least one microcontroller disposed within the vehicle; ii) transferring the data through an OBD, OBD-II or equivalent electrical connector to a data collector/router that includes a microprocessor and an electrically connected wireless transmitter; iii) transmitting a data packet representing the data with the wireless transmitter over an airlink to a wireless communications system and then to a host computer; and iv) analyzing the data packet with the host computer to characterize the vehicle's performance.

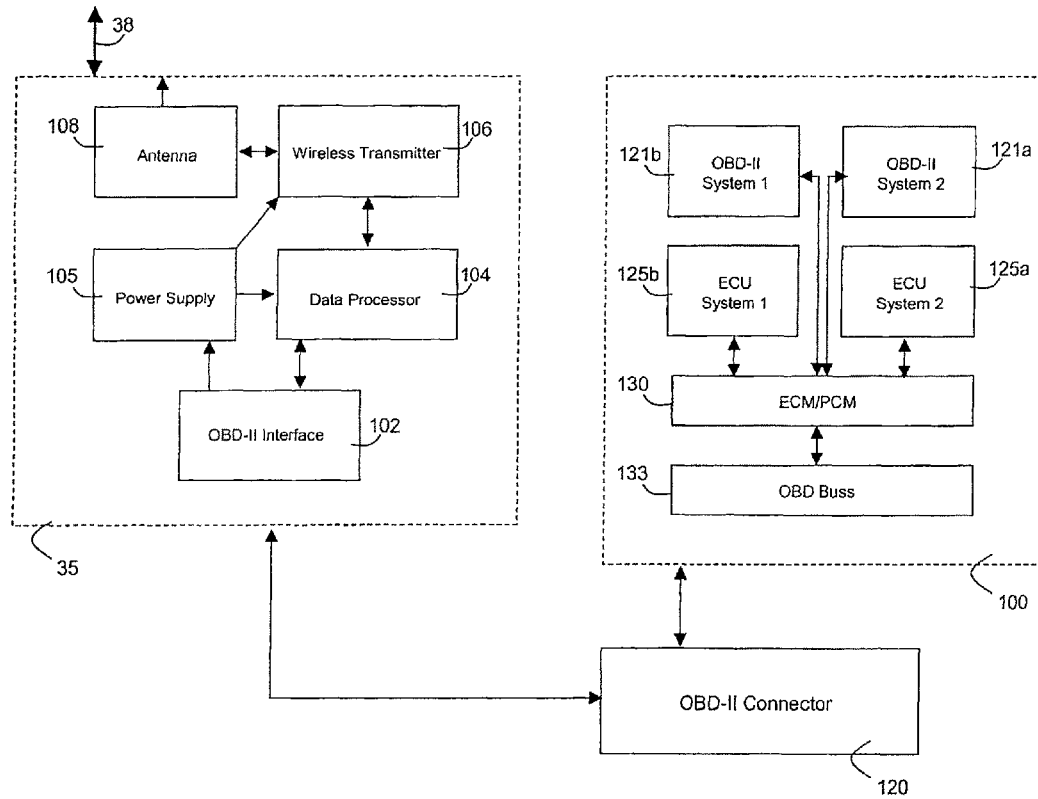

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 14, 25, 27, 32-37, 39, 41-42, 44-48, 50, 51, 55-56, 58, 61-67, 69-70, 72-76, 78, 106-109, 111 and 114 are cancelled.

Claims 5, 8, 10, 19 and 23-24 are determined to be patentable as amended.

Claims 9 and 20, dependent on an amended claim, are determined to be patentable.

New claims 117 and 118 are added and determined to be patentable.

Claims 2-4, 6-7, 11-13, 15-18, 21-22, 26, 28-31, 38, 40, 43, 49, 52-54, 57, 59, 60, 68, 71, 77, 79-105, 110, 112, 113, 115 and 116 were not reexamined.

5. The method of claim [1] *118*, wherein the retrieved data describes at least one of the vehicle's mileage, exhaust emissions, engine performance, engine temperature, coolant temperature, intake-manifold pressure, vehicle-identification number, engine-performance tuning parameters, alarm status, accelerometer status, fuel-injector performance, spark-plug timing, odometer reading, and a status of an anti-lock braking system.

8. The method of claim [1] *118*, further comprising wirelessly transmitting location data representative of the vehicle's location with the wireless transmitter.

10. The method of claim [1] *118*, wherein the *first and second* predetermined time [interval is] *intervals are* programmable.

19. The system of claim [14] *117*, further comprising a location-determining component configured to determine location data representative of the vehicle's location, wherein the wireless transmitter is configured to receive the location data and wirelessly transmit the location data.

23. The system of claim 14, wherein the wireless transmitter is configured to transmit [data at a configurable predetermined or random time interval] *a first set of data at a configurable first predetermined time interval and a second set of data at a configurable second predetermined time interval, wherein data of the first set differs from data of the second set and wherein the first predetermined time interval is different from the second predetermined time interval.*

24. The system of claim [14] *23*, wherein the retrieved data describes at least one of the vehicle's mileage, exhaust emissions, engine performance, engine temperature, coolant temperature, intake-manifold pressure, vehicle-identification number, engine-performance tuning parameters, accelerometer status, fuel-injector performance, spark-plug timing, and a status of an anti-lock braking system.

*117. A system for characterizing a vehicle's performance, comprising:*
  *(a) a data collector/router comprising,*
    *(i) an electrical connector configured to connect to the vehicle's OBD or OBD-II connector;*
    *(ii) a microprocessor interfaced with the electrical connector, the microprocessor configured to retrieve data generated by the vehicle, wherein the microprocessor is configured to retrieve and to transmit a first set of data at a first predetermined time interval and a second set of data at a second predetermined time interval, wherein data of the first set differs from data of the second set and wherein the first predetermined time interval is different from the second predetermined time interval; and*
    *(iii) a wireless transmitter configured to receive the data from the microprocessor and wirelessly transmit the data.*

*118. A method for characterizing a vehicle's performance, comprising:*
  *(a) retrieving data representative of the vehicle's performance, through the vehicle's OBD or OBD-II connector, according to a communication protocol, at a predetermined time interval, and with a data collector, the data collector comprising,*
    *i) an electrical connector configured to connect to the OBD or OBD-II connector,*
    *ii) a microprocessor interfaced with the electrical connector and configured to retrieve and transmit a first set of data at a first predetermined time interval and a second set of data at a second predetermined time interval, wherein data of the first set differs from data of the second set and wherein the first predetermined time interval is different from the second predetermined time interval, and*
    *iii) a wireless transmitter interfaced with the microprocessor; and*
  *(b) wirelessly transmitting the data with the wireless transmitter.*

\* \* \* \* \*